(12) United States Patent
Qi et al.

(10) Patent No.: US 12,119,731 B2
(45) Date of Patent: Oct. 15, 2024

(54) LINEAR ACTUATOR CONTROL CIRCUIT CAPABLE OF ACHIEVING ACCURATE POSITIONING, AND LINEAR ACTUATOR

(71) Applicant: MAN WAH INTELLIGENT TECHNOLOGY (HUI ZHOU) CO., LTD., Guangdong (CN)

(72) Inventors: Fayun Qi, Guangdong (CN); Zeming Sun, Guangdong (CN); Zuochao Peng, Guangdong (CN); Dinglue Chen, Guangdong (CN); Zilong Li, Guangdong (CN); Dazhuan Tang, Guangdong (CN)

(73) Assignee: MAN WAH INTELLIGENT TECHNOLOGY (HUI ZHOU) CO., LTD., Huizhou (CN)

( * ) Notice: Subject to any disclaimer, the term of this patent is extended or adjusted under 35 U.S.C. 154(b) by 202 days.

(21) Appl. No.: 18/058,727

(22) Filed: Nov. 23, 2022

(65) Prior Publication Data

US 2024/0014707 A1 Jan. 11, 2024

(30) Foreign Application Priority Data

Jul. 6, 2022 (CN) .......................... 202210788529.9

(51) Int. Cl.
| | | |
|---|---|---|
| *H02P 6/30* | (2016.01) | |
| *F16H 25/20* | (2006.01) | |
| *H02K 7/06* | (2006.01) | |
| *H02K 41/02* | (2006.01) | |
| *H02K 7/116* | (2006.01) | |

(52) U.S. Cl.
CPC ............... *H02K 7/06* (2013.01); *F16H 25/20* (2013.01); *H02K 41/02* (2013.01); *H02P 6/30* (2016.02); *H02K 7/1166* (2013.01)

(58) Field of Classification Search
CPC ........ H02K 7/06; H02K 41/02; H02K 7/1166; F16H 25/20; H02P 6/30; H02P 6/006; H02P 8/005; H02P 25/06
See application file for complete search history.

(56) References Cited

U.S. PATENT DOCUMENTS

2018/0177654 A1* 6/2018 Muscarello .............. A61G 1/04
2022/0385214 A1* 12/2022 Zhou ......................... H02P 6/30

* cited by examiner

*Primary Examiner* — Cortez M Cook (57) ABSTRACT

Disclosed are a linear actuator control circuit capable of achieving accurate positioning, and a linear actuator. The control circuit comprises a motor driving circuit, a master control circuit and at least one intermediate switch; by disposing the intermediate switch between two ends of a stroke of the linear actuator, the intermediate switch can be triggered when the linear actuator runs to the intermediate switch; after the master control circuit receives information of the intermediate switch, running of the linear actuator is stopped, so that the linear actuator stops running when accurately running to a state that the intermediate switch is triggered, and then, accurate positioning of a sliding block on the linear actuator is achieved.

10 Claims, 7 Drawing Sheets

LINEAR ACTUATOR CONTROL CIRCUIT CAPABLE OF ACHIEVING ACCURATE POSITIONING, AND LINEAR ACTUATOR

CROSS REFERENCE TO RELATED APPLICATIONS

The present application claims the benefit of Chinese Patent Application No. 202210788529.9 filed on Jul. 6, 2022, the contents of which are incorporated herein by reference in their entirety.

FIELD OF THE INVENTION

The present invention relates to the technical field of linear actuators, in particular to a linear actuator control circuit capable of achieving accurate positioning, and a linear actuator.

BACKGROUND OF THE INVENTION

A linear actuator, which mainly uses a motor and a worm and gear set to drive a screw to rotate forwards or reversely to enable the screw to drive a sliding block to do reciprocated linear motion, is widely applied to equipment such as a hospital bed, an electric chair, and a sofa or other occasions where telescopic motion is needed.

When being applied to the equipment such as the hospital bed, the electric chair, and the sofa, the linear actuator is generally used for adjusting angles of various components, namely back-lying degrees, however, there is a certain delay time from reaction by a person to entry into a comfortable situation to stopping of adjustment by virtue of a switch and to reaction by a circuit, therefore, positioning is often inaccurate, and a high comfort level cannot be achieved.

SUMMARY OF INVENTION

The technical problem to be solved in the present invention is to provide a linear actuator control circuit capable of achieving accurate positioning, and a linear actuator so as to enable the sliding block on the linear actuator to stop at an accurate position.

In order to solve the above-mentioned technical problem, a technical solution adopted in the present invention is that: provided is a linear actuator control circuit capable of achieving accurate positioning, comprising a motor driving circuit, a master control circuit and at least one intermediate switch, wherein the intermediate switch and the motor driving motor are both electrically connected to the master control circuit, and the intermediate switch is located between two ends of a stroke of the linear actuator.

Further, the intermediate switch is an ordinary switch or a switch having a memory function.

Further, one or more intermediate switches are provided.

Further, the motor driving circuit comprises a motor forward rotation signal input end, a motor reverse rotation signal input end, a first triode, a second triode, a first relay and a second relay, wherein the motor forward rotation signal input end and the motor reverse rotation signal input end are electrically connected to the master control circuit;

the motor forward rotation signal input end is electrically connected to a base of the first triode, an emitter of the first triode is grounded, a collector of the first triode is electrically connected to one end of a coil of the first relay, the other end of the coil of the first relay is electrically connected to a power source of the control circuit, a common end of the first relay is electrically connected to a positive electrode of a motor of the linear actuator, a normally-closed end of the first relay is grounded, and a normally-open end of the first relay is electrically connected to an external power source; and the motor reverse rotation signal input end is electrically connected to a base of the second triode, an emitter of the second triode is grounded, a collector of the second triode is electrically connected to one end of a coil of the second relay, the other end of the coil of the second relay is electrically connected to the power source of the control circuit, a common end of the second relay is electrically connected to a negative electrode of the motor of the linear actuator, a normally-closed end of the second relay is grounded, and a normally-open end of the second relay is electrically connected to the external power source.

Further, the motor driving circuit further comprises a push rod position detection circuit.

Further, the push rod position detection circuit comprises an operational amplifier, wherein an input end of the operational amplifier is electrically connected to the normally-closed end of the first relay and the normally-closed end of the second relay, and an output end of the operational amplifier is electrically connected to the master control circuit.

Further, a user manual control button is further included, wherein the user manual control button is electrically connected to the master control circuit.

Further, a power supply circuit is further included, wherein the power supply circuit acquires power from the outside and supplies power to the control circuit.

Further, the motor driving circuit comprises a main motor driving circuit and an auxiliary motor driving circuit.

Another technical solution adopted in the present invention is that:

provided is a linear actuator capable of achieving accurate positioning, comprising a lead screw and a sliding block sliding along the lead screw; wherein the linear actuator further comprises a motor that drives the lead screw to rotate so as to drive the sliding block to slide along the lead screw; a first stroke switch, a second stroke switch and at least one intermediate switch are disposed on a stroke of the sliding block, the first stroke switch and the second stroke switch are located on two ends of the stroke of the sliding block, and the intermediate switch is located between the first stroke switch and the second stroke switch; and the linear actuator further comprises a control circuit, wherein the motor, the first stroke switch, the second stroke switch and the intermediate switch are all electrically connected to the control circuit.

The present invention has the beneficial effects.

According to the linear actuator control circuit capable of achieving accurate positioning, by disposing the intermediate switch between two ends of the stroke of the linear actuator, the intermediate switch can be triggered when the linear actuator runs to the intermediate switch; after the master control circuit receives information of the intermediate switch, running of the linear actuator is stopped, so that the linear actuator can stop running when accurately running to a state that the intermediate switch is triggered, and then, accurate positioning of a sliding block on the linear actuator is achieved.

According to the linear actuator capable of achieving accurate positioning, by disposing the intermediate switch between two ends of the stroke of the sliding block, the intermediate switch will be triggered when the motor drives the sliding block to slide to the intermediate switch along the lead screw, after receiving information of the intermediate switches, the control circuit controls the sliding block on the linear actuator to stop running, so that the sliding block can stop running when accurately running to a state that the intermediate switch is triggered, and then, accurate positioning of the sliding block on the linear actuator is achieved.

DESCRIPTIONS FOR REFERENCE SIGNS 1, lead screw; 2, sliding block; 3, motor; 4, stroke switch; and 5, intermediate switch.

DETAILED DESCRIPTION OF ILLUSTRATED EMBODIMENTS

In order to better understand and implement technical solutions in the embodiments of the present invention, the technical solutions will be described clearly and completely below with reference to the accompanying drawings in the embodiments of the present invention.

In the descriptions of the present invention, it should be noted that directional or positional relationships indicated by terms such as "upper", "lower", "front", "rear", "left", "right", "vertical", "horizontal", "top", "bottom", "inner" and "outer" are directional or positional relationships based on the accompanying drawings, are merely for the convenience of describing the present invention and simplifying the description, rather than indicating or implying that the indicated device or element must have a specific orientation or be structured and operated in the specific orientation so as not to be understood as restrictions on the present invention.

Unless defined otherwise, all technical and scientific terms used herein have the same meaning as commonly understood by one of ordinary skill in the art to which the present invention belongs. Herein, the terms used in the description of the present invention are merely for the purpose of describing specific embodiments, rather than to limit the present invention.

Embodiment 1

Figure 1:
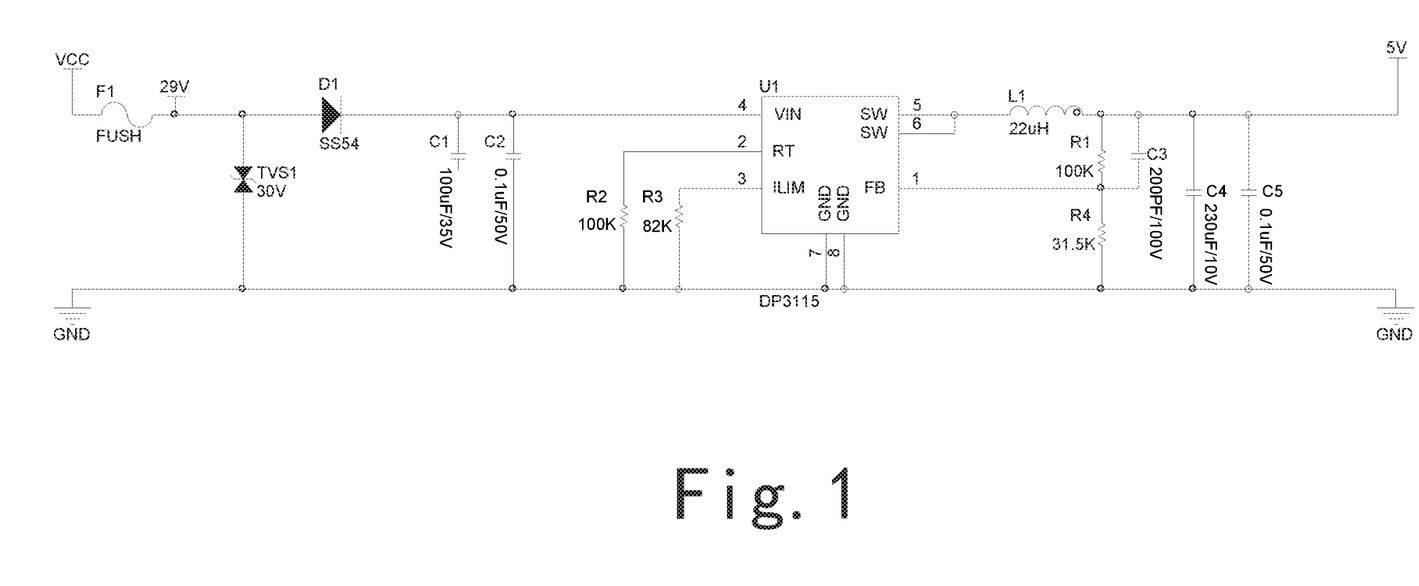
FIG. 1 is a schematic diagram of a circuit structure of a power supply circuit in the present invention.
Figure 2:
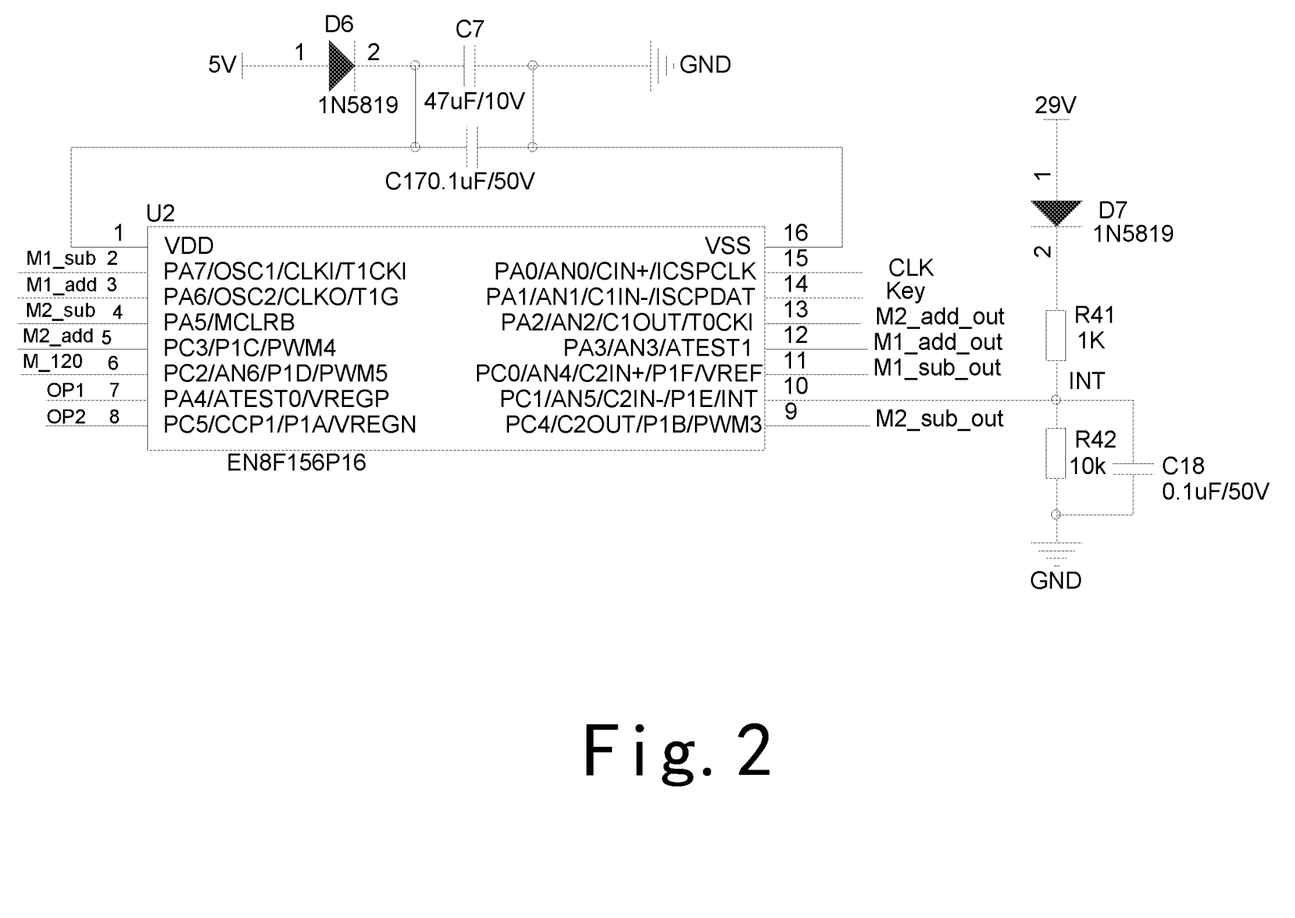
FIG. 2 is a schematic diagram of a circuit structure of a master control circuit in the present invention.
Figure 3:
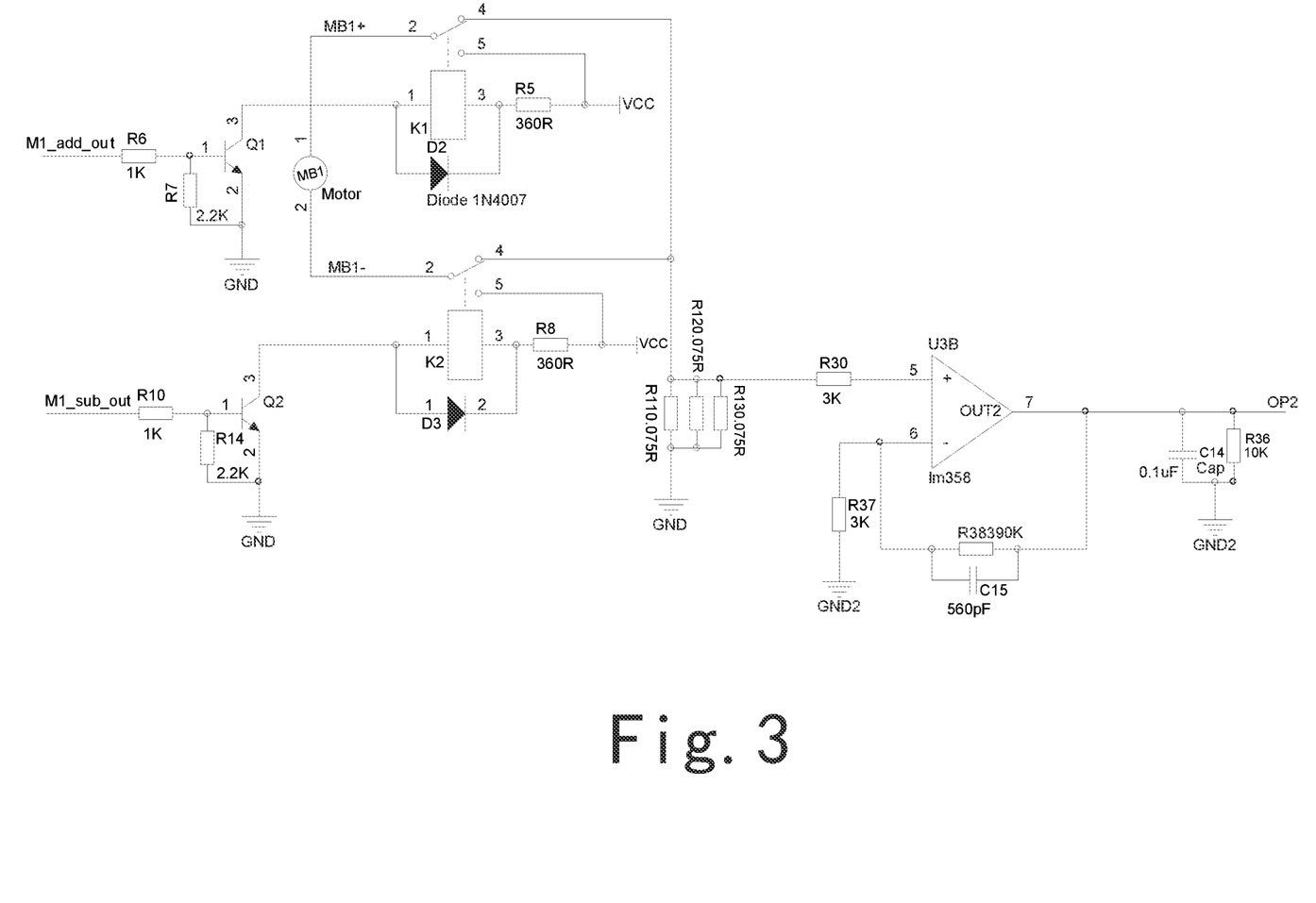
FIG. 3 is a schematic diagram of a circuit structure of a main motor driving circuit in the present invention.
Figure 4:
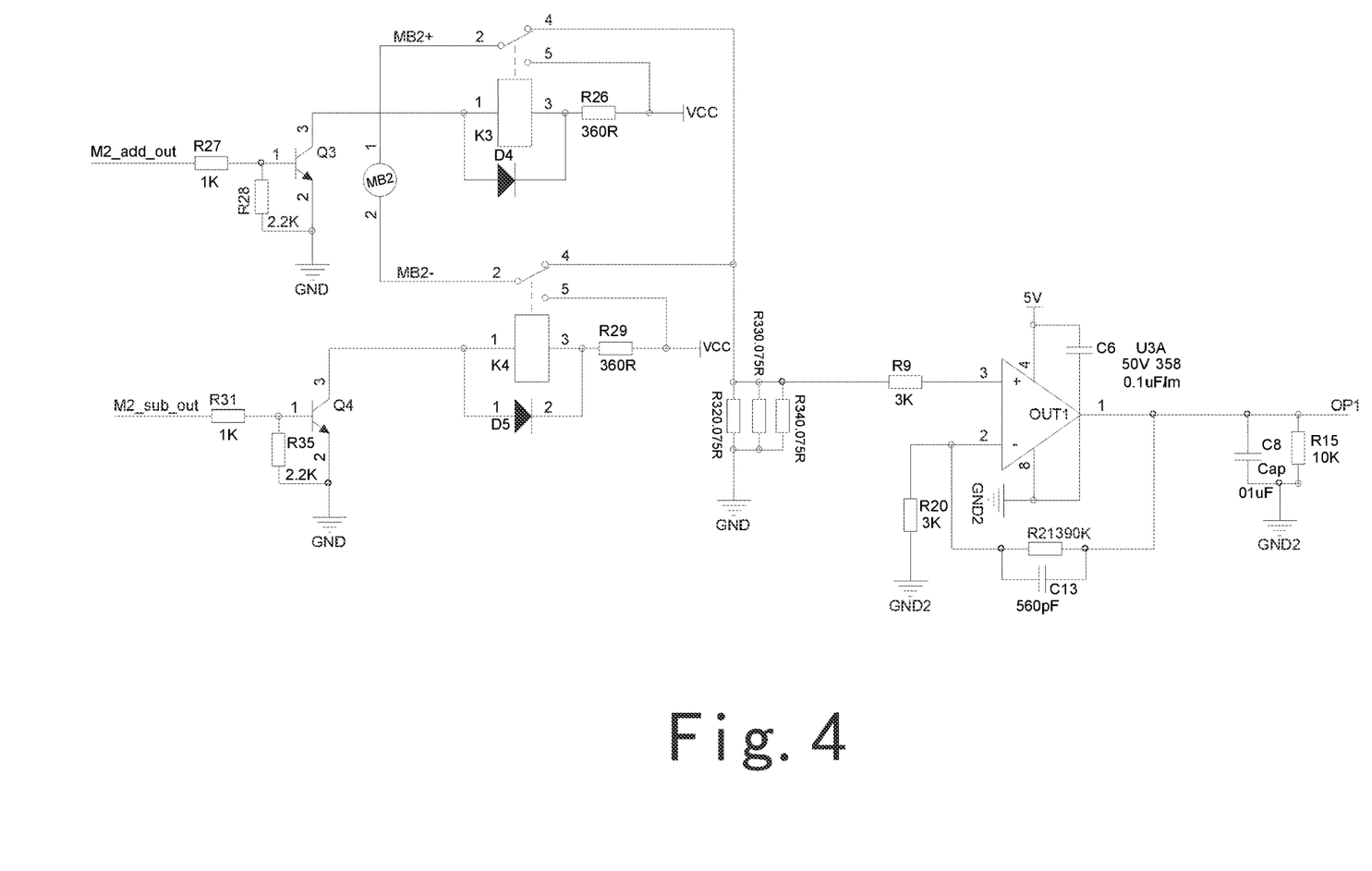
FIG. 4 is a schematic diagram of a circuit structure of an auxiliary motor driving circuit in the present invention.
Figure 5:
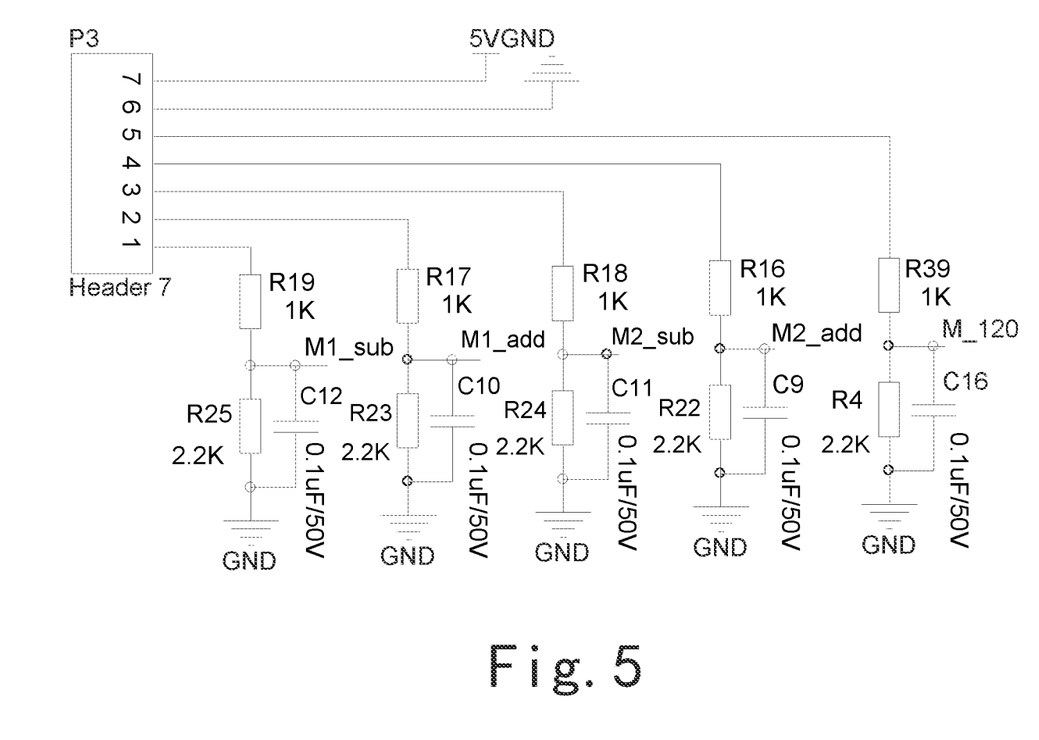
FIG. 5 is a schematic diagram of a circuit structure of a manual control circuit in the present invention.
Figure 6:
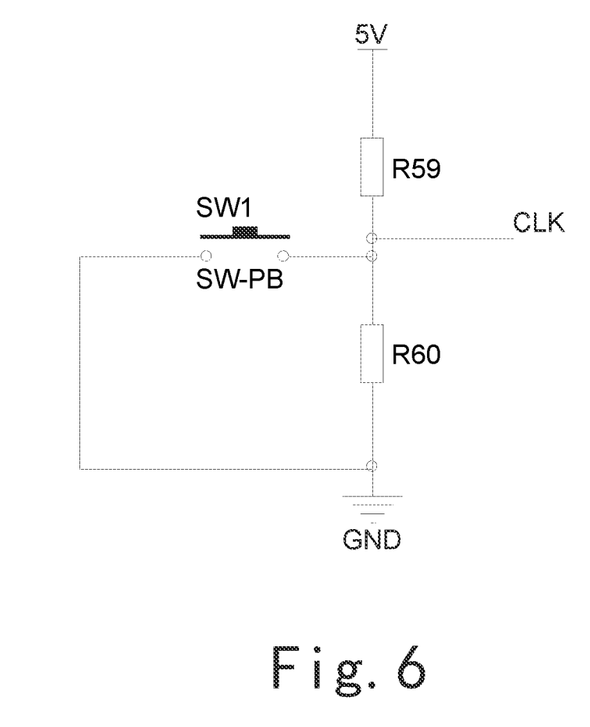
FIG. 6 is a schematic diagram of a circuit structure of an intermediate switch circuit in the present invention.

Provided is a linear actuator control circuit capable of achieving accurate positioning, comprising a power supply circuit as shown in FIG. 1, a master control circuit as shown in FIG. 2, a main motor driving circuit as shown in FIG. 3, an auxiliary motor driving circuit as shown in FIG. 4, a manual control circuit as shown in FIG. 5, and an intermediate switch circuit as shown in FIG. 6. In this embodiment, the linear actuator control circuit capable of achieving accurate positioning is specifically used for controlling linear actuators of a backrest and other parts of an electric sofa to work.

With reference to FIG. 1, the power supply circuit comprises a power supply chip U1 with a model of DP3115, an external power source VCC inputs a 29V voltage via a thermal fuse F1, the 29V voltage is electrically connected to a VIN pin of the power supply chip U1 via a diode D1, an RT pin of the power supply chip is grounded via a resistor R2, an ILIM pin of the power supply chip is grounded via a resistor R3, GND pins of the power supply chip are grounded, the VIN pin is grounded via a capacitor C1 and a capacitor C2 which are connected in parallel, SW pins output a 5V power source via an inductor L1 to supply power, an FB pin is electrically connected to the end, connected to a 5V output end, of the inductor L1 via a capacitor C3, the FB pin is grounded via a resistor R4 and is electrically connected to the end, connected to the 5V output end, of the inductor L1 via a resistor R1, and the 5V output end is grounded via a capacitor C4 and a capacitor C5 which are connected in parallel. The power supply circuit is provided with a transient diode TVS1 of which one end is connected between the thermal fuse F1 and the diode D1 and the other end is grounded, so as to prevent circuit surge.

With reference to FIG. 2 and FIG. 1, the master control circuit comprises a master control chip U2 with a model of ENROO EN8F156P16, the 5V output of the power supply circuit supplies power for the master control chip U2 via a diode D6, the external 29V voltage is grounded via a diode D7, a resistor R41 and a resistor R42, an INT pin of the master control chip is connected between the resistor R41 and the resistor R42 so as to trigger an interrupt when the external power source is powered down, and the INT pin is grounded via a capacitor C18 so as to achieve filtration.

With reference to FIG. 3 and FIG. 2, the main motor driving circuit is used for driving a motor of a sliding block on a main push rod to work, the sliding block on the main push rod is used for controlling the backrest of the electric sofa, the main motor driving circuit comprises a main motor forward rotation signal input end and a main motor reverse rotation signal input end, the main motor forward rotation signal input end is electrically connected to an IO port of the master control chip U2 to receive a main motor forward rotation signal M1_add_out, and the main motor reverse rotation signal input end is electrically connected to the IO port of the master control chip U2 to receive a main motor reverse rotation signal M1_sub_out.

The main motor forward rotation signal input end is electrically connected to a base of a triode Q1 via a resistor R6, the base of the triode Q1 is grounded via a resistor R7 so as to ensure that the base of the triode Q1 is at a low level when no external signals are input, an emitter of the triode Q1 is grounded, a collector of the triode Q1 is electrically connected to one end of a coil of a relay K1, the other end of the coil of the relay K1 is electrically connected to the external power source VCC via a resistor R5, a common end of the relay K1 is electrically connected to a positive electrode of a main motor B1, a normally-closed end of the relay K1 is electrically connected to the external power source VCC, and a normally-open end of the relay K1 is grounded via resistors R11, R12 and R13 which are connected in parallel; therefore, after the main motor forward rotation signal M1_add_out is received, the triode Q1 is turned on, the coil of the relay K1 is turned on, and the common end and the normally-open end are connected to acquire power; and when the main motor forward rotation signal M1_add_out is not received, the triode Q1 is turned off, and the common end and the normally-closed end are connected to be grounded.

Similarly, the main motor reverse rotation signal input end is electrically connected to a base of a triode Q2 via a resistor R10, the base of the triode Q2 is grounded via a resistor R14 so as to ensure that the base of the triode Q2 is at a low level when no external signals are input, an emitter of the triode Q2 is grounded, a collector of the triode Q2 is electrically connected to one end of a coil of a relay K2, the other end of the coil of the relay K2 is electrically connected to the external power source VCC via a resistor R8, a common end of the relay K2 is electrically connected to a negative electrode of the main motor B1, a normally-closed end of the relay K2 is electrically connected to the external power source VCC, and a normally-open end of the relay K2 is grounded via the resistors R11, R12 and R13 which are connected in parallel; therefore, after the main motor reverse rotation signal M1_sub_out is received, the triode Q2 is turned on, the coil of the relay K2 is turned on, and the common end and the normally-open end are connected to acquire power; and when the main motor reverse rotation signal M1_sub_out is not received, the triode Q2 is turned off, the common end and the normally-closed end are connected to be grounded, and therefore, when the main motor forward rotation signal M1_add_out is received, the main motor B1 rotates forwards to drive the sliding block to move upwards; and when the main motor reverse rotation signal M1_sub_out is received, the main motor B1 rotates reversely to drive the sliding block to move downwards.

In this embodiment, as shown in FIG. 3 and FIG. 2, the main motor driving circuit further comprises a main push rod position detection circuit comprising an operational amplifier, the operational amplifier is an operational amplifier chip U3B with a model of LM358, a positive input end of the operational amplifier chip U3B is electrically connected to the normally-closed end of the relay K1 and the normally-closed end of the relay K2 via a resistor R30, a negative input end of the operational amplifier chip U3B is grounded via a resistor R37, an output end of the operational amplifier chip U3B is electrically connected to the negative input end of the operational amplifier chip U3B via a resistor R38 and a capacitor C15 which are connected in parallel to form negative feedback, the output end of the operational amplifier chip U3B is electrically connected to the IO port of the master control chip U2 so as to output a voltage signal to be acquired by the master control chip U2, and the master control chip U2 determines the position of the sliding block on a main push rod according to the acquired voltage signal.

With reference to FIG. 4 and FIG. 2, in this alternative embodiment, an auxiliary motor driving circuit used for driving an auxiliary motor on an auxiliary push rod to work so as to drive other parts of the electric sofa to move is further included, wherein the other parts can be a headrest of the electric sofa or a storage plate at the bottom of the electric sofa and even a folding table stored in the electric sofa. The circuit structure and principle of the auxiliary motor driving circuit are similar to the circuit structure and principle of the main motor driving circuit, can be understood with reference to the descriptions for the main motor driving circuit, and will be omitted herein.

With reference to FIG. 5 and FIG. 2, the manual control circuit comprises a user manual control button P3 which is electrically connected to the 5V power source to acquire power; a main motor reverse rotation button is grounded via a resistor R19 and a resistor R25, and the IO port of the master control chip U2 is connected between the resistor R19 and the resistor R25 to acquire a voltage-divided main motor reverse rotation input signal M1_sub; similarly, a main motor forward rotation button is grounded via a resistor R17 and a resistor R23, and the IO port of the master control chip U2 is connected between the resistor R17 and the resistor R23 to acquire a voltage-divided main motor forward rotation input signal M1_add. An auxiliary motor forward rotation button is grounded via a resistor R16 and a resistor R22, and the IO port of the master control chip U2 is connected between the resistor R16 and the resistor R22 to acquire a voltage-divided auxiliary motor forward rotation input signal M2_add; and similarly, an auxiliary motor reverse rotation button is grounded via a resistor R18 and a resistor R24, and the IO port of the master control chip U2 is connected between the resistor R18 and the resistor R24 to acquire a voltage-divided auxiliary motor reverse rotation input signal M2_sub, so that a user can control the forward rotation and the reverse rotation of the main motor and the auxiliary motor via the manual control button P3, and then, the work of the sliding blocks on the main push rod and the auxiliary push rod is controlled. Similarly, a reset button is grounded via a resistor R39 and a resistor R40, and the IO port of the master control chip U2 is connected between the resistor R39 and the resistor R40 to acquire a voltage-divided reset signal M120, so that the user can control the main motor and the auxiliary motor via the manual control button P3 to drive the sliding blocks on the main push rod and the auxiliary push rod to reset to a position which can be a default position set when the sliding block leaves the factory or a memorized position set by the user, such as the position where the intermediate switch circuit is located.

With reference to FIG. 6 and FIG. 2, the intermediate switch circuit comprises an intermediate switch SW1, the 5V power supply is grounded after being divided by a resistor R59 and a resistor R60, one end of the intermediate switch SW1 is grounded, the other end of the intermediate switch SW1 is connected between the resistor R59 and the resistor R60, and the IO port of the master control chip U2 is connected between the resistor R59 and the resistor R60 to acquire a signal of the intermediate switch SW1, thereby achieving accurate positioning.

In an alternative embodiment, one, two or more intermediate switches can be provided, it is possible that each intermediate switch is provided with an independent intermediate switch circuit, or a plurality of intermediate switches share the same intermediate switch circuit, so as to control the sliding blocks of the linear actuator to accurately stop at the positions of the corresponding intermediate switches. In addition, the intermediate switch can be an ordinary switch or a memory switch having a memory function. The intermediate switch is electrically connected to the master control chip to provide its position to the master control chip U2, so that the sliding blocks can directly run to the memorized position of the intermediate switch.

Embodiment 2

Figure 7:
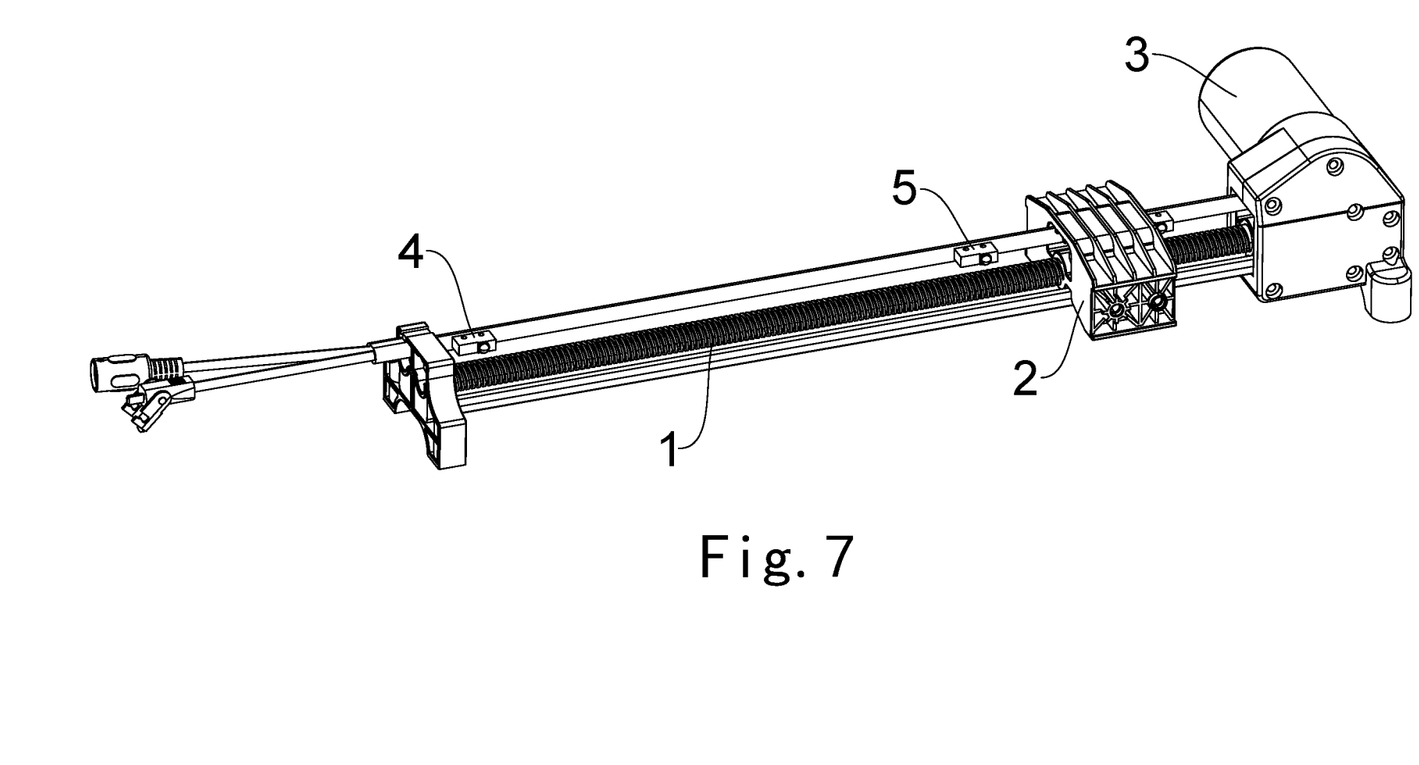
FIG. 7 is a structural schematic diagram of a linear actuator capable of achieving accurate positioning in the present invention.

With reference to FIG. 7, provided is a linear actuator capable of achieving accurate positioning, which is provided with the linear actuator control circuit in embodiment 1, of course, other control circuits can also be adopted as long as the control circuit can achieve the following purposes that: when an intermediate switch 5 is triggered when the control circuit controls a motor 3 to drive a sliding block 2 to slide to the intermediate switch 5 along a lead screw 1, after receiving information of the intermediate switch 5, the control circuit controls the lead screw 1 to stop rotating, so that the sliding block 2 can stop running when accurately running to a state that the intermediate switch 5 is triggered, and then, accurate positioning of the sliding block 2 on the linear actuator is achieved.

The linear actuator in this embodiment adopts the control circuit in embodiment 1. The linear actuator comprises the lead screw 1 and the sliding block 2 sliding along the lead screw 1 and further comprises the motor 3 that drives the lead screw 1 to rotate so as to drive the sliding block 2 to slide; a first stroke switch 4 and a second stroke switch 4 are located on two ends of a stroke of the sliding block 2 and are used to be triggered when the sliding block 2 slides to an edge of the stroke, for example, when the sliding block 2 triggers the first stroke switch 4, a motor driving circuit receives an input of a motor forward rotation signal, thereby driving the motor 3 to rotate forwards; and when the sliding block 2 moves to trigger the second stroke switch 4, the motor driving circuit receives an input of a motor reverse rotation signal, thereby driving the motor 3 to rotate reversely.

The linear actuator further comprises an intermediate switch 5 located between the first stroke switch 4 and the second stroke switch 4. In this embodiment, there is one intermediate switch 5, of course, more than one switch, such as two or three switches, can be disposed between the first stroke switch 4 and the second stroke switch 4 according to actual needs. The intermediate switch 5 is triggered when the sliding block 2 moves to the intermediate switch 5, the circuit of the intermediate switch 5 is closed, an IO port of a master control chip U2 acquires a signal of an intermediate switch SW1, at the moment, the motor 3 stops moving, so that the sliding block 2 can accurately stop at the intermediate switch 5. Then, if a motor forward rotation button is pressed, the motor 3 starts to rotate forwards; if a motor reverse rotation button is pressed, the motor 3 starts to rotate reversely; if a motor reset button is pressed, the motor 3 rotates and drives the sliding block 2 to move to an initially set position.

In an alternative embodiment, one or two or more intermediate switches 5 can be provided to control the sliding blocks 2 of the linear actuator to accurately stop at the positions of the corresponding intermediate switches 5, and the intermediate switch 5 can be an ordinary switch or a memory switch having a memory function so as to provide its position to the master control chip U2, so that the sliding block can directly run to the position, memorized by the master control chip U2, of the intermediate switch 5, and then, accurate positioning is achieved.

The technical means disclosed by the solutions of the present invention are not limited to the technical means disclosed in the above-mentioned implementations and further include technical solutions formed by any combinations of the above-mentioned technical features. It should be noted that several improvements and modifications can also be made to the present invention by those of ordinary skill in the art without departing from the principle of the present invention, and these improvements and modifications are also considered as falling into the protection scope of the present invention.

The invention claimed is:

1. A linear actuator control circuit capable of achieving accurate positioning, characterized by comprising a motor driving circuit, a master control circuit, and at least one intermediate switch, wherein the intermediate switch and the motor driving motor are both electrically connected to the master control circuit, and the intermediate switch is located between two ends of a stroke of a linear actuator.

2. The linear actuator control circuit capable of achieving accurate positioning according to claim 1, characterized in that the intermediate switch is an ordinary switch or a switch having a memory function.

3. The linear actuator control circuit capable of achieving accurate positioning according to claim 1, characterized in that one or more intermediate switches are provided.

4. The linear actuator control circuit capable of achieving accurate positioning according to claim 1, characterized in that the motor driving circuit comprises a motor forward rotation signal input end, a motor reverse rotation signal input end, a first triode, a second triode, a first relay and a second relay, wherein the motor forward rotation signal input end and the motor reverse rotation signal input end are electrically connected to the master control circuit;

the motor forward rotation signal input end is electrically connected to a base of the first triode, an emitter of the first triode is grounded, a collector of the first triode is electrically connected to one end of a coil of the first relay, an opposite end of the coil of the first relay is electrically connected to a power source of the control circuit, a common end of the first relay is electrically connected to a positive electrode of a motor of the linear actuator, a normally-closed end of the first relay is grounded, and a normally-open end of the first relay is electrically connected to an external power source; and the motor reverse rotation signal input end is electrically connected to a base of the second triode, an emitter of the second triode is grounded, a collector of the second triode is electrically connected to one end of a coil of the second relay, the other end of the coil of the second relay is electrically connected to the power source of the control circuit, a common end of the second relay is electrically connected to a negative electrode of the motor of the linear actuator, a normally-closed end of the second relay is grounded, and a normally-open end of the second relay is electrically connected to the external power source.

5. The linear actuator control circuit capable of achieving accurate positioning according to claim 4, characterized in that the motor driving circuit further comprises a push rod position detection circuit.

6. The linear actuator control circuit capable of achieving accurate positioning according to claim 5, characterized in that the push rod position detection circuit comprises an operational amplifier, wherein an input end of the operational amplifier is electrically connected to the normally-closed end of the first relay and the normally-closed end of the second relay, and an output end of the operational amplifier is electrically connected to the master control circuit.

7. The linear actuator control circuit capable of achieving accurate positioning according to claim 1, characterized by further comprising a user manual control button, wherein the user manual control button is electrically connected to the master control circuit.

8. The linear actuator control circuit capable of achieving accurate positioning according to claim 1, characterized by further comprising a power supply circuit, wherein the power supply circuit acquires power from outside and supplies power to the control circuit.

9. The linear actuator control circuit capable of achieving accurate positioning according to claim 1, characterized in that the motor driving circuit comprises a main motor driving circuit and an auxiliary motor driving circuit.

10. A linear actuator capable of achieving accurate positioning, characterized by comprising a lead screw and a sliding block sliding along the lead screw, wherein the linear actuator further comprises a motor that drives the lead screw to rotate so as to drive the sliding block to slide along the lead screw; a first stroke switch, a second stroke switch and at least one intermediate switch are disposed on a stroke of the sliding block, the first stroke switch and the second stroke switch are located on two ends of the stroke of the sliding block, and the intermediate switch is located between the first stroke switch and the second stroke switch; and the linear actuator further comprises a control circuit, wherein the motor, the first stroke switch, the second stroke switch, and the intermediate switch are all electrically connected to the control circuit.

* * * * *